United States Patent
Korte et al.

(10) Patent No.: US 8,181,708 B2
(45) Date of Patent: May 22, 2012

(54) WATER SWELLING RUBBER COMPOUND FOR USE IN REACTIVE PACKERS AND OTHER DOWNHOLE TOOLS

(75) Inventors: James R. Korte, Katy, TX (US); John J. Thurston, Houston, TX (US); James Edward Goodson, Porter, TX (US)

(73) Assignee: Baker Hughes Incorporated, Houston, TX (US)

( * ) Notice: Subject to any disclaimer, the term of this patent is extended or adjusted under 35 U.S.C. 154(b) by 749 days.

(21) Appl. No.: 12/242,338

(22) Filed: Sep. 30, 2008

(65) Prior Publication Data
US 2009/0084550 A1    Apr. 2, 2009

Related U.S. Application Data

(60) Provisional application No. 60/976,575, filed on Oct. 1, 2007.

(51) Int. Cl.
*E21B 33/12* (2006.01)
(52) U.S. Cl. .......... 166/387; 166/182; 166/187
(58) Field of Classification Search .......... None
See application file for complete search history.

(56) References Cited

U.S. PATENT DOCUMENTS

| | | | |
|---|---|---|---|
| 4,590,227 A | 5/1986 | Nakamura et al. | |
| 6,358,580 B1 | 3/2002 | Mang et al. | |
| 6,681,849 B2 | 1/2004 | Goodson, Jr. | |
| 6,848,505 B2 | 2/2005 | Richard et al. | |
| 7,143,832 B2 * | 12/2006 | Freyer | 166/387 |
| 2005/0171248 A1 | 8/2005 | Li et al. | |
| 2007/0056735 A1 * | 3/2007 | Bosma et al. | 166/295 |

OTHER PUBLICATIONS

P. McElfresh et al.; "Studies of Water Swellable NBR for Downhole Sealing Applications," Rubber World, May 1, 2008, available without Figures from http://www.thefreelibrary.com/_/print/Pr9intArticle.aspx?id=179241932.
J. Goodson et al.; "Effect of Salt Type, Concentration and Temperature on Water Swelling Packer Compound," Proceedings: Oilfield Engineering with Polymers 2008, Oct. 7-8, 2008, Session 2, Cavendish Conference, London, UK, pp. 1-8.

* cited by examiner

*Primary Examiner* — Zakiya W Bates
(74) *Attorney, Agent, or Firm* — Mossman Kumar & Tyler PC

(57) ABSTRACT

Through the combination of at least two polymer families, and the optimization of other components, a rubber compound has been developed for use in downhole applications that will swell in water-based fluids. A cellulose component, such as carboxy methyl cellulose (CMC), is used together with an acrylate copolymer (AC) that can increase the swelling capacity of an acrylonitrile butadiene rubber (NBR) in water. The amount of swelling achieved depends on physical boundaries and limitations, the salinity of the water, and the temperature.

14 Claims, 5 Drawing Sheets

FIG. 3 - Original Water Swelling Compound in Room Temperature Salts

FIG. 4 - Comparison of Original vs Improved NBR swelling compound in Room Temperature Water.

WATER SWELLING RUBBER COMPOUND FOR USE IN REACTIVE PACKERS AND OTHER DOWNHOLE TOOLS

CROSS-REFERENCE TO RELATED APPLICATION

This application claims the benefit of U.S. Provisional Patent Application No. 60/976,575 filed Oct. 1, 2007.

TECHNICAL FIELD

The present invention relates to water-swellable elastomers, and more particularly relates, in one non-limiting embodiment, to compositions useful for forming water-swellable seals on downhole tools and methods of using them.

TECHNICAL BACKGROUND

Well pipe such as coiled or threaded production tubing, for example, is surrounded by an annular space between the exterior wall of the tubing and the interior wall of the well casing or borehole wall. Frequently, it is necessary to seal this annular space between upper and lower portions of the well depth. Appliances for accomplishing the sealing function are known in the well drilling arts as "packers". Traditionally, the sealing element of a packer is a ring of rubber or other elastomer that is in some manner secured and sealed to the interior well surface which may be the interior casing wall or the raw borehole wall. By compression, for example, the ring of rubber is expanded radially against the casing or borehole wall.

"Bridge plugs" are well appliances for obstructing the flow continuity of an entire bore; whether it is the entire cross-section of the wellbore, the cross-section of a well casing or the cross-section of a production tube.

One of the greater utilities for a well packer or bridge plug is to isolate a designated section of well bore along the wellbore length that penetrates a particular zone or earth strata. In some cases, the isolated zone may be burdened with an inordinately high internal pressure. For that reason, the packer or bridge plug may be called upon to confine an unusually high pressure differential.

In other cases, where the packer engages the raw borehole wall to seal the annulus, for example, the packer must tightly and continuously engage a rough and highly irregular wall surface.

Either of the two examples above necessitate unusually high applications of setting force against the sealant to attain the degree of rigidity and seal quality required with elastomers having the essential stiffness and other properties necessary to confine high differential pressure loads or expand into deep contours. However, high force and stress loads on a well tube also introduce the potential for other forms of tool and equipment failure.

Reactive Element Packers or REPackers available from Baker Oil Tools are commercial isolation tools that use elastomer swelling technology to provide a barrier in casing/open hole and casing/casing annuli. Such packers may have a water reactive section, an oil reactive section, or both. A water reactive section may consist of water-absorbing particles incorporated in a field-proven nitrile-based polymer. These particles swell via absorbing water, which in turn expands the rubber without being physically absorbed into the rubber matrix, which can adversely affect properties. An oil reactive section may utilize oleophilic polymers that absorb hydrocarbons into the matrix. This process may be a physical uptake of the hydrocarbon which swells, lubricates and decreases the mechanical strength of the polymer chain as it expands.

It would be desirable if the elastomers used in reactive element packers could be improved to swell to a greater volume than previously known. Such greater volumes would give greater tightness and continuity when the isolation tools engage the casing or the borehole wall.

SUMMARY

There is provided, in one non-limiting form, a water swellable elastomer that includes at least one base polymer, which may be acrylonitrile butadiene rubber (NBR), at least one cellulose, at least one acrylic copolymer (AC), and at least one curative.

In another non-restrictive embodiment, there is further provided a selectively deployed sealing element for a well flow channel. The sealing element is responsive to contact with water and involves an elastomer that again includes at least one base polymer (e.g. NBR), at least one cellulose, at least one AC, and at least one curative.

Also, in an alternative non-limiting embodiment, there is provided a well packer having an expandable packing element for sealing a well annulus and an elastomer for expanding the packing element into operative engagement across said annulus. Once more, the elastomer includes at least one base polymer (e.g. NBR), at least one cellulose, at least one AC, and at least one curative.

Further there is offered in a different non-restrictive embodiment, a method for sealing a well flow channel that involves introducing a sealing element into a well adjacent a flow channel and contacting the sealing element with water to deploy, expand or enlarge the sealing element to seal the flow channel. The sealing element may again involve an elastomer including at least one base polymer (e.g. NBR), at least one cellulose, at least one AC, and at least one curative. All of these elastomers may also contain fillers, activators, antioxidants, process aids, and combinations thereof.

BRIEF DESCRIPTION OF THE DRAWINGS

FIG. 6 is a schematic, cross-section view of the downhole tool of FIG. 5 where the selectively deployable sealing element has been deployed or permitted to expand or enlarge up against the walls of a well borehole into which it has been inserted or run in.

Figure 5:
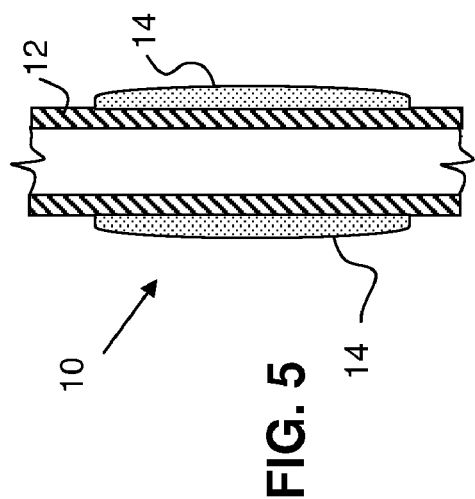
FIG. 5 is a schematic, cross-section view of a downhole tool having a central support substrate or base pipe which bears a selectively deployable sealing element (a water swellable elastomer as described herein) in its original, first stable state or initial cross-sectional shape, shown in elevation.
Figure 6:
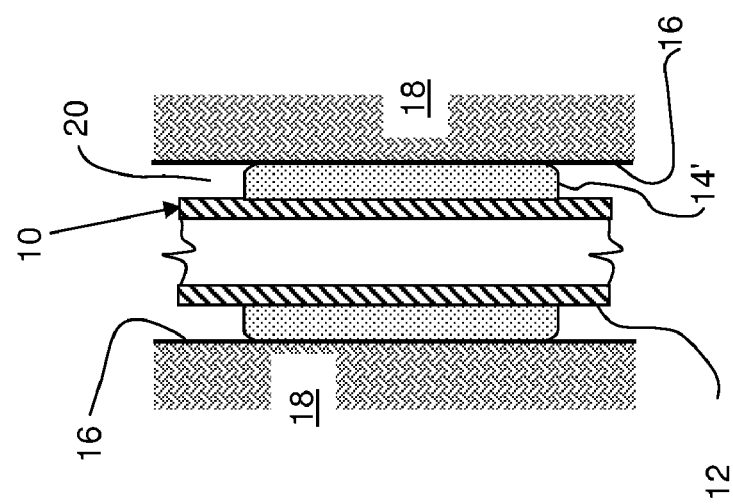

It will be appreciated that FIGS. 5 and 6 are simply schematic illustrations which are not to scale and that the relative sizes and proportions of different elements may be exaggerated for clarity or emphasis.

DETAILED DESCRIPTION

A new water-swelling rubber compound has been discovered that gives improved water swelling volumes under the same conditions as compared with conventional compounds. Through the combination of at least two polymer families, as well as the optimization of other components, a rubber compound has been developed for use in downhole applications that will swell in water-based fluids such as water based muds or brines to an improved extent. In one non-limiting embodiment, a cellulose component, such as carboxy methyl cellulose (CMC), is used together with an acrylate copolymer (AC) that can increase the swelling capacity of an acrylonitrile butadiene rubber (NBR) in water to over 1000%. The amount of swelling achieved and the rate of swelling depends on physical boundaries and limitations, the salinity of the water, and the temperature. The swell amount may also be affected by the salinity of the water-based fluid. The lower the salinity of mono-valent salts (e.g. NaCl, KCl), the faster the rate of swelling and the more swelling that can be achieved. Similarly, the lower the concentration of co-valent salts ions present (e.g. $CaCl_2$) the faster the rate of swelling and the more swelling that can be achieved. A typical bonded section of the new rubber may increase its original volume up to 150% in a typical downhole fluid containing 3.5 NaCl (typical salt water concentration) at temperatures from as low as ambient (70° F. or 21° C.) to as high as 260° F. (127° C.), possibly as high as 300° F. (149° C.). In a nearly salt free water environment, the compound could expand on a mandrel with sufficient rubber in the range of 300-400 volume %. Increasing the volume of the elastomer by swelling in water, improves the ability of the elastomer to more completely and forcefully seal off a flow channel such as a well annulus and the like.

The water-swelling elastomer compound described herein is a nitrile-based formulation. A water swelling copolymer which is emulsified in a nitrile soluble oil allows incorporation of this polymer/oil mixture into the nitrile base polymer. In addition to these two materials, several other materials such as fillers and curatives are typically added to give the rubber strength and suitable final properties. Another key material added is a cellulose-based material.

The "base" polymer may be an acrylonitrile butadiene rubber (NBR) and/or any polymer that is tolerated by or compatible with the liquid dispersed polymers (LDP) described below or to be developed. NBR is a family of unsaturated copolymers of 2-propenenitrile and various butadiene monomers (1,2-butadiene and 1,3-butadiene). Although its physical and chemical properties vary depending on the polymer's composition of acrylonitrile (the more acrylonitrile within the polymer, the higher the resistance to oils but the lower the flexibility of the material), this form of synthetic rubber is generally resistant to oil, fuel, and other chemicals. Other grades of NBR may also be optionally used herein, in non-limiting examples hydrogenated NBR (HNBR) and carboxylated hydrogenated NBR (XHNBR). Suitable, but non-limiting examples of NBR include, but are not limited to NIPOL® 1014 NBR available from Zeon Chemicals, LP; Perbunan NT-1846 from LanXess or N22L from JSR. Given a suitable LDP, Other suitable base polymers may include, but are not necessarily limited to, EPDM, synthetic rubbers based on polychloroprene (NEOPRENE® polymers from DuPont), fluorinated polymer rubbers (e.g. FKM), tetrafluoro ethylene propylene rubbers (FEPM, such as AFLAS® fluoroelastomers available from Asahi Glass Co. Ltd.), fluorosilicone rubber (FVMR), butyl rubbers (IIR) and the like.

NBR does not swell significantly in water, thus the addition of the two important ingredients, an Acrylic Copolymer (AC), for instance dispersed in a nitrile-compatible phthalate ester, and a Carboxy Methyl Cellulose (CMC), help make this compound unique.

The AC is a mixture comprised of approximately 50% active polymer and 50% phthalate ester oil carrier. Suitable examples of this material include, but are not necessarily limited to, those produced by CIBA Specialty Chemicals (UK) and is sold to others for use in PVC, as well as any other material generally regarded as a Super Absorbent Polymer (SAP) in solid or liquid form. This oil/polymer blend is referred to herein as Liquid Dispersed Polymer (LDP). However, it should be understood that other LDPs besides the above-described one are expected to be useful in the water swellable elastomers herein. In a non-limiting example, another potentially suitable LDP available from CIBA Specialty Chemicals is one that is based in either a paraffinic, naphthenic or aromatic based oil or any combination thereof, which is compatible with EPDM (ethylene propylene diene monomer). Thus, EPDM is another possibility for the base polymer herein, and other oils besides phthalate esters are also expected to be suitable. It will be appreciated that this LDP material may have ratios other than 50% polymer and 50% oil carrier and still be useful and effective for the purposes and elastomers set out herein. Another alternative material includes AQUALIC CS-6S, a water absorbent polymer available from Nippon Shokubai Co., Ltd. in solid powder form.

It should also be understood that unless otherwise noted herein, the term "polymer" comprises polymers of one monomer, copolymers, terpolymers and polymeric forms of more than one type of monomer.

An important feature of the compound described herein is the combined swelling effect gained when the LDP is used together with the CMC. The rubber may be made to swell with either, but there are physical limitations of adding each. For instance, the LDP is a liquid and the cellulose is a dry powder. Without wishing to be limited to any particular explanation, it is believed that there is no chemical interaction occurring between the two components. However, there may be a physical interaction of water transference between the two additives, although the inventors do not want to be restricted by this theory. There appears to be a synergistic effect between the two which ultimately yields a rubber compound which has more swelling ability, more desirable processing and better physical properties as compared to otherwise identical compounds where one or the other is not included. The CMC being a solid powder helps to absorb the oil portion of the LDP which helps to give the rubber strength as well as making the rubber less soft during processing and ultimately a higher hardness when cured.

The proportions of the three important ingredients, NBR, LDP, CMC, are all in the 15-35 weight % range for each, based on the total components. Normally, with rubber compounds, composition is expressed in terms of parts per hundred parts rubber or phr. All recipes start with 100 parts of raw polymer and then other materials are expressed in parts compared to that. In one non-limiting embodiment in this case, as will be shown, the base polymer is 100 phr NBR with from about 18 to 52 vol % ACN (acrylonitrile). In the compound herein, the range of LDP may be in the range of about 80 to about 140 phr. That would be equivalent to about 40-70 phr of the swelling AC. The high oil content may become a limiting factor as to how much of the LDP may be physically added to the NBR. If a higher concentration of the swelling polymer was to become commercially available, then the phr range of 80-140 would still be applicable, however, the active level of polymer would increase beyond the current 40-70 phr range which should result in an elastomer capable of even higher swelling. The CMC would be thus be in the range of about 50-150 phr.

Suitable acrylic copolymers include, but are not necessarily limited to copolymers of acrylic acid and its esters with other materials such as sodium hydroxide, polyacrylamide copolymer, ethylene maleic anhydride copolymer, cross linked CMC, polyvinyl alcohol copolymers, cross linked polyethylene oxide and starch grafted copolymer of poly ACN. Cellulose is a general name and in general a commodity. One non-limiting, suitable example is chemically referred to as Carboxy Methyl Cellulose (CMC) and is generally sold under some form of this name. Other suitable specific examples of CMC include, but are not limited to, AKU-CELL® AF3281 CMC available from Akzo Nobel, CMC from Aqualon, and CMC from Quingdae Rich Chemicals. Any other general cellulose forms such as hydroxypropylmethyl cellulose (HPMC) or methylcellulose (MC) and combinations thereof that function to accomplish the properties and goals of the water swellable elastomers herein and which are compatible with the other components are acceptable for use herein.

Other important ingredients or components in addition to the three discussed above include fillers, activators, antioxidants, process aids, and curatives. There are various other grades of fillers which may be used alone or in combination, and in lesser or greater amounts that may yield comparable, desirable or improved rubber properties. Suitable fillers include, but are not necessarily limited to, carbon black, silica (silicon dioxide, $SiO_2$), clays, calcium carbonate, bentonite and the like and combinations thereof. The proportion of filler may range between about 30 and 100 phr. Suitable activators include, but are not necessarily limited to, magnesium oxide (MgO), zinc oxide (ZnO), zinc stearate, stearic acid and the like and combinations thereof. The proportion of activator may be in the range from about 1-10 phr. Suitable antioxidants include, but are not necessarily limited to, any of the diphenyl amines (e.g. NAUGARD® antioxidants available from Chemtura Corporation), or any of the mercaptobenzimidazoles (e.g. VANOX ZMTI from RT Vanderbilt) and the like and combinations thereof. Suitable process aids include, but are not necessarily limited to, waxes (e.g. VANFRE® waxes available from R. T. Vanderbilt Company), or process aids such as WB-16 process additive from Strucktol and the like and combinations thereof. The antioxidants and the process aids may each be in the range of from about 0.5 to about 5.0 phr.

A variety of various curatives or agents may be used in the cure package (generally sulfur and at least one accelerator). Suitable curatives or curing agents may include, but are not necessarily limited to, sulfur, peroxide and their co-agents (such as VULCUP 40KE available from Crompton and triallyl isocyanurate (TAIC)) and the like and an accelerator. Suitable sulfur accelerators include, but are not necessarily limited to, mercapto compounds, sulfenamides, thiuram compounds, and the like and combinations thereof. Non-limiting examples of more specific mercapto compounds include 2-mercaptobenzothiazole (MBT), mercaptobenzothiazyl disulfide (MBTS), sulfenamides such as benzothiazyl-2-t-butyl sulfenamide (TBBS), and thiurams such as tetramethyl thiuram disulfide (TMTD) and the like, and combinations thereof. Suitable curatives and accelerators may be each present in the range from about 0.2 to about 3.0 phr.

Non-limiting, suitable ranges for each of the components of the water swellable elastomers herein are summarized in Table I.

TABLE I

Component Proportions for Water Swellable Elastomers

| Component | phr | alternative phr |
|---|---|---|
| Nitrile (NBR) with ACN % (18-52%) | 100 | 100 |
| CMC | 50-150 | 100-150 |
| Carbon Black | 30-100 | 60-100 |
| Silica | 30-100 | 20-50 |
| Acrylic Copolymer (AC) | 80-140 | 100-130 |
| Magnesium Oxide | 1-10 | 3-8 |
| Antioxidant | 0.5-5.0 | 0.5-3.0 |
| Wax | 0.5-5.0 | 0.5-3.0 |
| Sulfur | 0.2-3.0 | 0.2-3.0 |
| Accelerator | 0.2-3.0 | 0.2-3.0 |

In one non-limiting embodiment, the composition of the water swelling elastomer does not include a water soluble resin. Such water soluble resins that may be avoided in some non-restrictive versions include polyethylene oxides, polyvinylpyrrolidones, hydroxyethylcelluloses or hydroxypropylcelluloses.

The addition, blending or compounding of these components may be performed by any conventional technique or method to be developed in the future. For instance, the rubber compound may be mill mixed or mixed in a Banbury or other internal mixer. Furthermore, there are no special curing conditions required. These compounds may be cured in normal, ambient settings or as more commonly done they can be cured in a heated oven or autoclave. As is typical, the amount of cure needed may vary by the size and thickness. Increases or decreases in the time and/or temperature of cure may be readily made depending on a particular application.

The water swellable elastomers herein may find a wide variety of uses and are not limited to downhole tools used in hydrocarbon recovery operations, although this is certainly one suitable application. In particular, the water swellable compounds are expected to be useful as selectively deployed sealing elements for flow channels, particularly well flow channels such as annuli and the like. Suitable downhole tools for use in hydrocarbon exploration and recovery operations include, but are not necessarily limited to well packers, bridge plugs, expandable pipes or any other well tool requiring a swelling or expanding area to seal or block fluid flow. These tools once deployed, swollen, enlarged and/or expanded are not desired to shrink and be extracted. In some non-limiting instances, the elastomeric seals may shrink should they no longer become in contact with an aqueous fluid and be allowed to "dry out", but this is highly unlikely in a downhole application.

An example of using the water swellable elastomers described herein on a downhole tool, in a specific case a packer, is schematically illustrated in FIGS. 5 and 6 where the overall downhole tool or downhole zone isolator (packer) 10 has a central support substrate or mandrel 12, shown in partial cross-section as of generally tubular shape, around which has been formed a selectively deployed sealing element 14 of the water swellable elastomer. The expansion element 14. The selectively deployed sealing element 14 has a first or initial size as seen in FIG. 5.

During run-in of the tool into the wellbore, the selectively deployed sealing element 14 is in its first or initial state which will allow it to be put in the correct place easily. After contact with water or brine, the selectively deployed sealing element 14' will expand, swell or be deployed to it's a second shape and volume, and will then conform to the borehole walls 16 of the subterranean formation 18. This will be some different or second size of selectively deployed sealing element 14' as shown in FIG. 6 of greater than the volume of the initial or first size shown in FIG. 5. In this manner, wellbore 20 is sealed at this point. The water or brine to deploy the selectively deployed sealing element 14 outward may come from the water in the subterranean formation, or may be pumped downhole from the surface.

In particular, the water swellable elastomers herein are expected to be used in wellbore isolation products similar to the Reactive Element Packer (REPackers) and FORMPAC™ packers, which are considered expandable tools, all available from Baker Oil Tools. Expandable tools are made from special pipe that is swaged when in place, which thins and expands the pipe to make it larger by about 20-25%. Adding or applying the water swelling rubber to the outside of this pipe allows the tool to seal in a slightly larger or irregular hole than the expandable pipe could do on its own.

The invention will now be illustrated using certain specific Examples which are not meant to limit it in any way, but simply to further illuminate it.

EXAMPLES

Shown in FIGS. 1-4 are several plots which show the increase in swell capability of the water swellable elastomer compound compared to an identical compound without CMC, the effect of temperature on the rate of swell, the effect of salt concentration, and the effect that various salts have on the swelling of the compound. As will be seen, the water swellable rubber works best in water-based fluids with low salt content. The higher the salt content, the less it will swell. This is believed to be due to the ionic hindrance that the mono-valent salts; such as $Na^+$ and $K^+$ impart around the water swelling elastomer. This ionic affinity essentially blocks the polymer from absorbing the water molecules. As the concentration of salt increases, the more hindrance there is and thus less water swelling. As the temperature increases from ambient to 200° F. (93° C.) the rate of swell will increase. Above 200° F. (93° C.) the rate increase is less significant. Initially, the bulk of applications are expected to be in this range, but it is anticipated that the water swelling elastomers may find uses and applications up to temperatures as high as 300° F. (149° C.) or higher.

The water swellable formulation used in the experiments that gave the data presented in the Figures had the composition given in Table II.

TABLE II

| Component Proportions for Water Swellable Elastomer used in Figures Data | |
|---|---|
| Component | phr |
| Nitrile (NBR) with ACN | 100 |
| CMC | 150 |
| Carbon Black | 80 |
| Silica | 40 |

TABLE II-continued

| Component Proportions for Water Swellable Elastomer used in Figures Data | |
|---|---|
| Component | phr |
| Acrylic Copolymer (AC) | 120 |
| Magnesium Oxide | 5 |
| Antioxidant | 2 |
| Wax | 1 |
| Sulfur | 0.8 |
| Accelerator | 0.5 |
| TOTAL | 499.3 |

Figure 1:
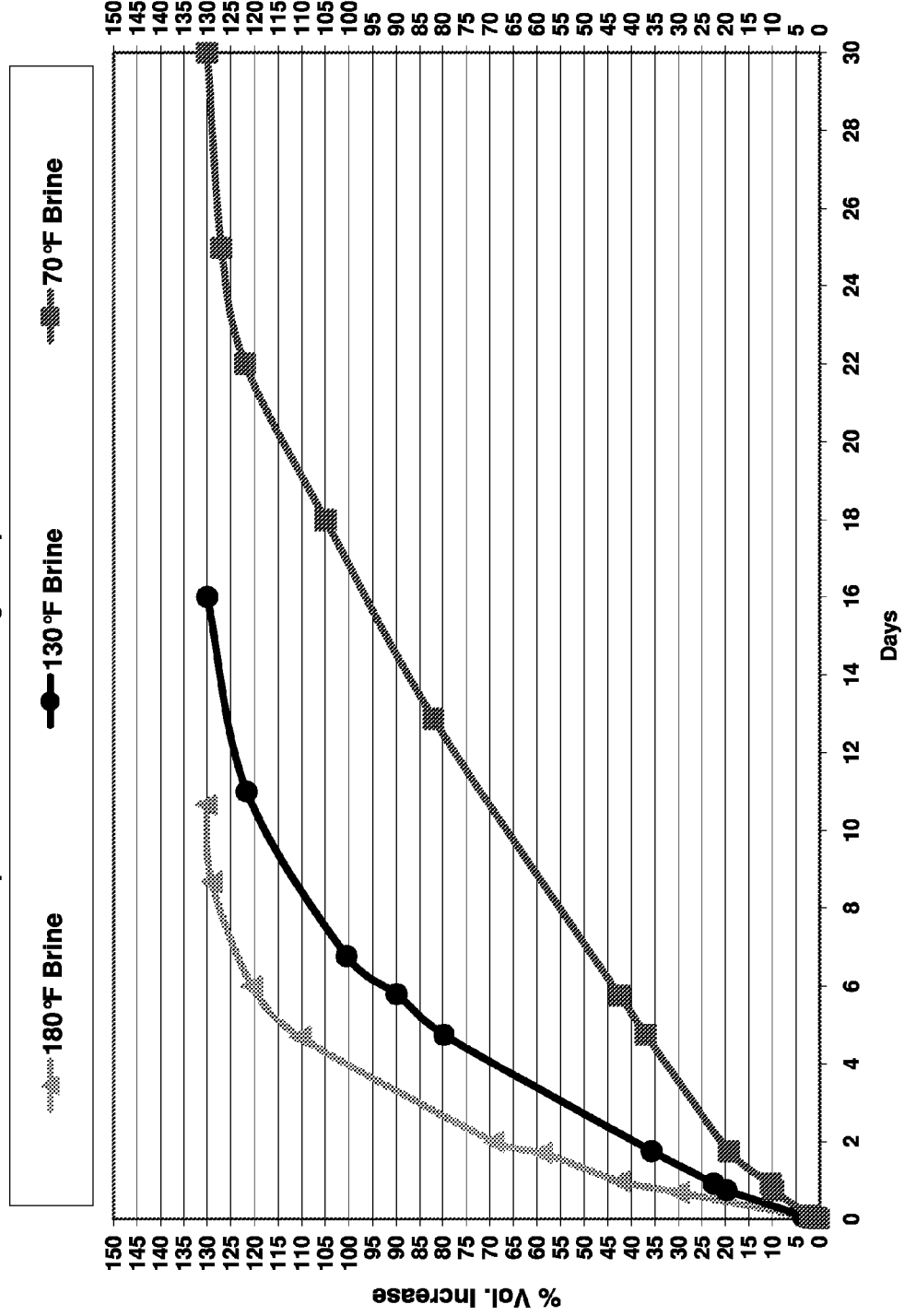
FIG. 1 is a graph of % volume increase as a function of temperature over time for an improved water swelling compound described herein contacting 3.5% NaCl Brine at three different temperatures: 180° F. (82° C.), 130° F. (54° C.), and 70° F. (21° C.)

FIG. 1 presents a graph of % volume increase as a function of temperature over time for an improved water swelling compound herein generated by contacting the rubber with 3.5% NaCl Brine at three different temperatures: 180° F. (82° C.), 130° F. (54° C.), and 70° F. (21° C.). It may be seen that the vol % increase of 130% was achieved in each case, but that the swelling rate was faster with increasing temperature.

Figure 2:
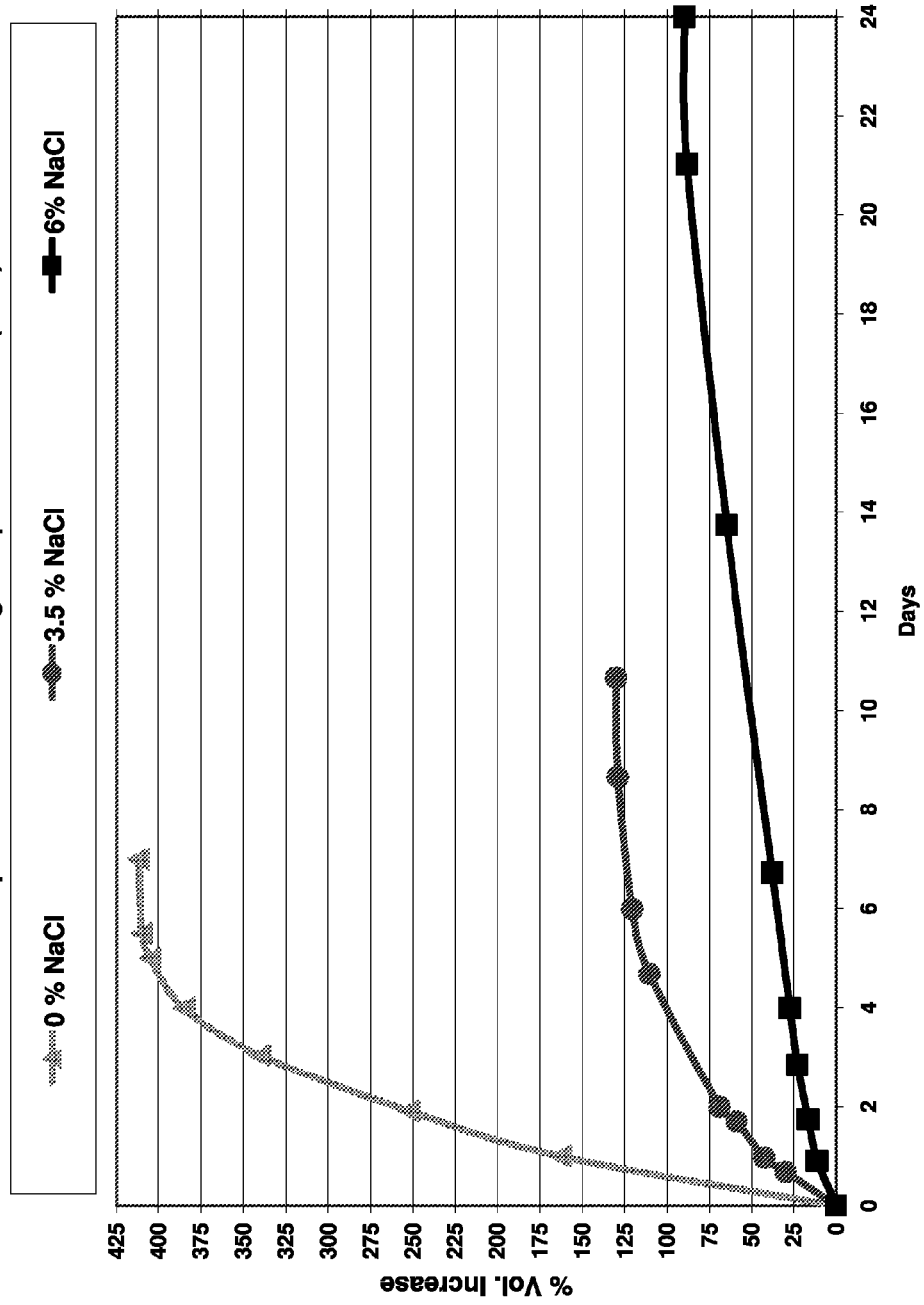
FIG. 2 is a graph of % volume increase as a function of NaCl concentration over time for an improved water swelling compound herein contacting water at 180° F. (82° C.), where the water contains no NaCl, and then 3.5% and 6% NaCl.

FIG. 2 shows a graph of % volume increase as a function of NaCl concentration over time for an improved water swelling compound herein contacting water at 180° F. (82° C.), where the water contains no NaCl, and then 3.5% and finally 6% NaCl. It may be seen that maximum swelling decreased with increasing sodium chloride content. Where no NaCl was present, the vol % increase was about 413%, whereas when the water was 6% NaCl brine, the vol % increase was only about 90%.

Figure 3:
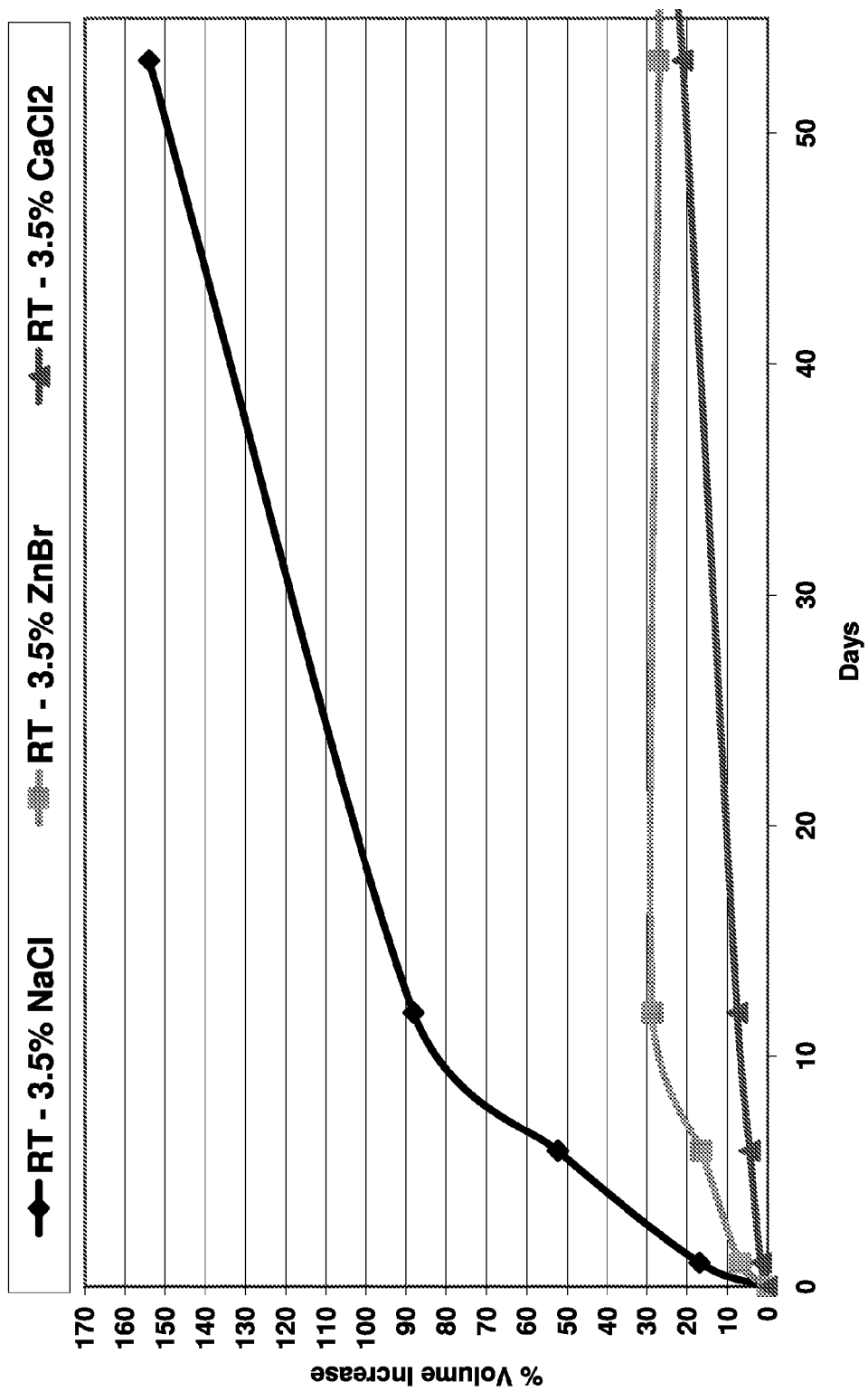
FIG. 3 is a graph of % volume increase as a function of different salts and ion types over time for an improved water swelling compound herein contacting water at room temperature, where the water contains 3.5% of three different salts: NaCl, ZnBr and $CaCl_2$.

FIG. 3 presents a graph of % volume increase as a function of different salts and ion type over time for an improved water swelling compound herein contacting water at room temperature, where the water contains 3.5% of three different salts: NaCl, ZnBr and $CaCl_2$. It may be seen that of the three aqueous brines, the volume increase was greatest and fastest for the mono valiant NaCl brine. The vol % increase was slowest and lowest for the di-valiant $CaCl_2$ brine, and intermediate for the ZnBr brine. This is because it takes less of the larger di-valent salts such as $Ca^{++}$, to sufficiently block or interfere with the water from reacting with the elastomer. Thus, concentrations of as low as 2% of these di-valent salts can be sufficient to significantly reduce the swelling of these compounds to levels that might not allow the tool to swell to the required amount, even in requirements of less than 15%.

Figure 4:
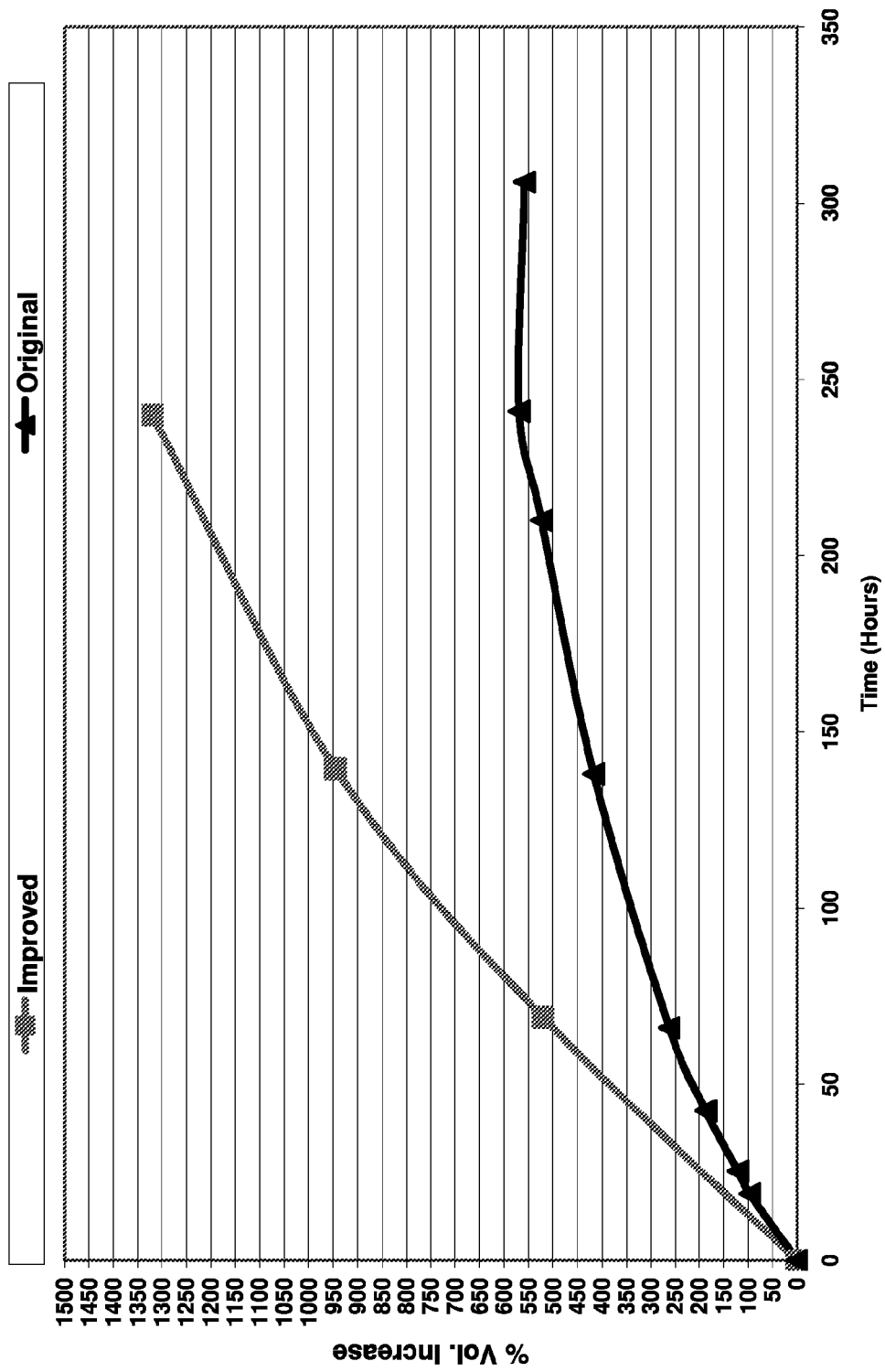
FIG. 4 is a graph of % volume increase over time for an improved water swelling compound herein contacting water at room temperature contrasted with a prior water swelling compound.

Finally, FIG. 4 demonstrates a graph of % volume increase over time for an improved water swelling compound herein contacting water at room temperature contrasted with a prior water swelling compound. It may be readily seen that the inventive compound herein relatively rapidly gave an increase of over 1300 vol % after about 240 hours, whereas the comparative compound after about the same period of time leveled off at about a 520 vol % increase.

It may thus be seen that the water swelling elastomer compound herein has improved swelling as compared with an otherwise identical compound absent the cellulose component. In addition, the water swelling elastomers herein have improved processing and better physical properties than the comparative compounds.

In addition it has been common knowledge that acids will chemically react with and breakdown Acrylic Copolymers. Acids such as HCl are commonly used in acidizing situations and lab tests have verified that the HCl will chemically breakdown the AC and prevent the elastomer from swelling. This is different from the salt interference which is reversible; acid breakdown is not.

In the foregoing specification, the invention has been described with reference to specific embodiments thereof, and has been demonstrated as effective in providing methods and compositions for an elastomer with improved swelling volumes. However, it will be evident that various modifications and changes may be made thereto without departing from the broader spirit or scope of the invention as set forth in the appended claims. Accordingly, the specification is to be regarded in an illustrative rather than a restrictive sense. For example, specific combinations of base polymers, NBRs, celluloses, acrylic copolymers, fillers, curatives, activators, antioxidants, process aids, and other components falling within the claimed parameters, but not specifically identified or tried in a particular composition or method, are anticipated to be within the scope of this invention.

The terms "comprises" and "comprising" in the claims should be interpreted to mean including, but not limited to, the recited elements.

The present invention may suitably comprise, consist or consist essentially of the elements disclosed and may be practiced in the absence of an element not disclosed.

What is claimed is:

1. A selectively deployed sealing element for a flow channel, the sealing element being responsive to contact with water and comprising an elastomer comprising:
    about 100 phr of at least one base polymer,
    about 50 to about 150 phr of at least one cellulose,
    about 80 to about 140 phr of at least one acrylic copolymer (AC), and
    about 0.2 to about 6 phr of at least one curative.

2. The selectively deployed sealing element of claim 1 where the cellulose is selected from the group consisting of carboxy methyl cellulose (CMC), hydroxypropylmethyl cellulose (HPMC) or methylcellulose (MC), and combinations thereof.

3. The selectively deployed sealing element of claim 1 where the base polymer is selected from the group consisting of acrylonitrile butadiene rubber (NBR), ethylene propylene diene monomer rubber (EPDM), polychloroprene rubber, fluorinated polymer rubber, tetrafluoro ethylene propylene rubber (FEPM), fluorosilicone rubber (FVMR), butyl rubber (IIR) and combinations thereof.

4. The selectively deployed sealing element of claim 1 where the elastomer comprises at least one additional component selected from the group consisting of fillers, activators, antioxidants, process aids, and combinations thereof.

5. The selectively deployed sealing element of claim 3 where the components of the elastomer have the proportions:
    about 100 phr NBR,
    about 50 to about 150 phr cellulose,
    about 80 to about 140 phr AC,
    about 0.2 to about 6 phr curative,
    about 30 to about 100 phr carbon black filler,
    about 30 to about 100 phr silica filler,
    about 1 to about 10 phr activator,
    about 0.5 to about 5 phr antioxidant, and
    about 0.5 to about 5 phr process aid.

6. The selectively deployed sealing element of claim 1 where the flow channel is a wellbore annulus.

7. The selectively deployed sealing element of claim 1 where the sealing element is a well packer.

8. The selectively deployed sealing element of claim 1 where the sealing element is a bridge plug.

9. A well packer having an expandable packing element for sealing a wellbore annulus and an elastomer for expanding the packing element into operative engagement across said annulus, the elastomer comprising:
    about 100 phr of at least one acrylonitrile butadiene rubber (NBR),
    about 50 to about 150 phr of at least one cellulose,
    about 80 to about 140 phr of at least one acrylic copolymer (AC), and
    about 0.2 to about 6 phr of at least one curative.

10. A method for sealing a well flow channel comprising:
    introducing a sealing element into a well adjacent a flow channel,
    contacting the sealing element with water to deploy the sealing element to seal the flow channel;
where the sealing element comprises an elastomer comprising:
    about 100 phr of at least one acrylonitrile butadiene rubber (NBR),
    about 50 to about 150 phr of at least one cellulose,
    about 80 to about 140 phr of at least one acrylic copolymer (AC), and
    about 0.2 to about 6 phr of at least one curative.

11. The method of claim 10 where the water comprises brine.

12. The method of claim 10 where the cellulose is selected from the group consisting of carboxy methyl cellulose (CMC), hydroxypropylmethyl cellulose (HPMC) or methylcellulose (MC), and combinations thereof.

13. The method of claim 10 where the elastomer comprises at least one additional component selected from the group consisting of fillers, activators, antioxidants, process aids, and combinations thereof.

14. The method of claim 13 where the components of the elastomer have the proportions:
    about 100 phr NBR,
    about 50 to about 150 phr cellulose,
    about 80 to about 140 phr AC,
    about 0.2 to about 6 phr curative,
    about 30 to about 100 phr carbon black filler,
    about 30 to about 100 phr silica filler,
    about 1 to about 10 phr activator,
    about 0.5 to about 5 phr antioxidant, and
    about 0.5 to about 5 phr process aid.

* * * * *